United States Patent Office 3,013,166
Patented Dec. 12, 1961

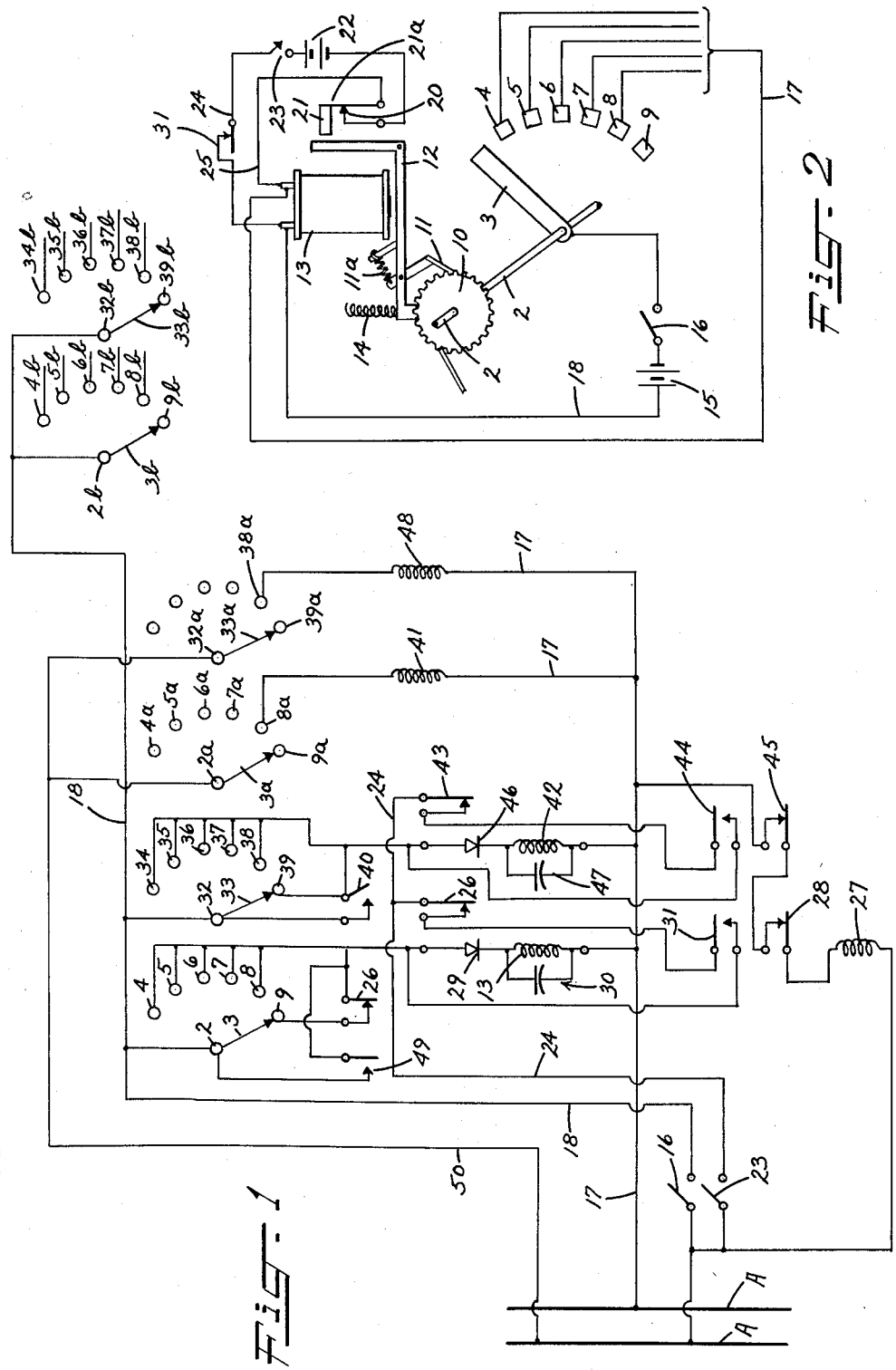

3,013,166
PROGRAMING CONTROL UNIT
Avner Dunlap, Philadelphia, Pa., assignor to
Luke H. Lipka, Philadelphia, Pa.
Filed Sept. 17, 1959, Ser. No. 840,736
8 Claims. (Cl. 307—115)

This invention relates to program control units. More particularly this invention relates to program control units whereby a number of electrically controlled devices are actuated in a predetermined and controlled sequence.

Many devices that perform different functions or the same functions in different ways are connected in an electrical circuit and provided with control means whereby the different devices acting either independently or in groups together will carry out a certain series of operations in a predetermined sequence. The devices are generally electrically controlled by apparatus comprising a stepping switch having a certain number of electrical contacts. For mechanical reasons the number of contact points that may be built into a stepping switch are necessarily limited.

This invention has for its principal object to provide programing devices comprising a plurality of stepping switches with means whereby the stepping switches are separately actuated and in a predetermined sequence by the same control means.

Another object of the invention is to provide programing devices comprising a plurality of stepping switches with means whereby the stepping switches are separately actuated and in a predetermined sequence by the same control means and resetting means for returning the stepping switches to the starting position.

A further object is to provide program devices comprising a plurality of stepping switches with means whereby the stepping switches are separately actuated and in a predetermined sequence by the same control means and means for automatically resetting the circuit from engagement with the last contact of the last stepping switch back to the first contact of the first stepping switch.

Other objects and advantages of the invention will be apparent from the following description and the accompanying drawings.

In the drawings:

FIGURE 1 is a diagrammatic view of a circuit embodying the present invention.

FIGURE 2 is a diagrammatic view of a form of stepping switch and its circuit that may be used with the present invention.

In general, the invention comprises a certain form of programing device for actuating and operating a number of electrically controlled devices either alone or in selected groups to operate in a certain predetermined sequence.

The invention is adapted for use in controlling the operation of machine tools that carry out a sequence of cutting or machining operations to operate in a certain sequence. The invention is also applicable for use in controlling the operations of the lighting, staging and sound effects in theatrical presentations. It is also applicable to the control of animated electrical signs, display devices, and the like.

Apparatus embodying the invention includes a plurality of stepping switches that each have a plurality of banks of electrical contacts. The stepping switches each have a zero or home position and a plurality of contact points in each bank. The contact points of one of the banks of each stepping switch are connected to the devices that are to be operated in a certain sequence. A certain circuit is provided whereby a first stepping switch is actuated from its zero position to each of its contact positions until its last contact position is reached in a step by step operation and is then returned to its zero position. When the first stepping switch is going from its last contact position back to its zero position the next stepping switch is automatically actuated to move from its zero position to its first contact position. The succeeding stepping switches are operated in the same manner. A reset switch is provided for automatically returning any of the stepping switches that are not in the zero or home position back to the zero position. A circuit is also provided for moving the first stepping switch directly to its first contact position immediately after the last stepping switch has been in its last position without the last stepping switch going back to its zero position.

Referring to the drawing in which preferred embodiments of the invention have been shown, in FIGURE 2 is shown a conventional rotary type stepping switch that may be used in this invention. For simplicity of illustration only one wiper blade, one bank of contact points and the circuit for actuating the switch itself are shown. Reference character 2 indicates a rotatable shaft which is shown in perspective and on which is fixed the wiper blade 3, the free end of which is formed to engage and make electrical contact with the plurality of contact points 4, 5, 6, 7 and 8 including the zero or home position 9 all of which are positioned in an arc concentric with the shaft 2. The wiper blade 3 is sufficiently wide so that it engages the contact toward which it has been moved before it becomes disengaged from the preceding contact point so that the circuit is not disengaged or interrupted by the stepping switch. A ratchet wheel 10 is fixed to the shaft and is engaged by the spring loaded pawl 11 carried by the pivoted or rotary armature bar 12. The pawl is urged by the spring 11a against the ratchet wheel 10.

A magnet coil 13 for actuating the armature 12 about its pivot against the action of the spring 14 is provided. The coil is connected to a source of electrical current such as the battery 15 through the spring loaded normally open impulse switch 16 in the line 18 and through the shaft 2, wiper 3, contacts 4, 5, 6, 7 and 8 and lead 17 back to the coil. The stepping switch is shown as having five contact points 4 to 8 and a zero or homing position 9 which will be more fully described in connection with FIGURE 1. It is understood that this is only one bank of the stepping switch and that any practicable number of banks of contact points may be employed. The banks are in parallel planes at right angles to the shaft and a wiper blade is provided for each bank. In order to rapidly return the wiper to the home or zero position without actuating the impulse switch 16 an interrupter is provided that when connected in the circuit is automatically actuated by the armature to actuate the wiper in steps to move to the zero or home position contact. The interrupter generally indicated by reference character 21a comprises the spring pressed or loaded contact bar 21 that is normally in contact with the contact 20 in series in the circuit comprising the battery 22 or other source of electricity, the interrupter switch 23 which is normally open and the lead wires 24 and 25 connected to the poles of the magnetic coil 13. In the general operation of the stepping switch the impulse switch 16 is closed energizing the coil 13 and drawing the armature bar toward the end of the coil against the action of the spring 14. The pawl merely rides over the teeth of the ratchet wheel 10. Upon releasing or opening the switch 16 the coil 13 is de-energized and the spring 14 moves the armature bar 12 away from the end of the coil. The pawl 11 as shown in moving downwardly with the armature bar engages the ratchet moving the ratchet wheel and the shaft 2 to which it is fixed in a clockwise direction and in turn moving the wiper 3 from one contact to another. To rapidly move the wiper to the zero or home position without operating the impulse switch 16, the interrupter switch 23 is closed energizing the coil 13 and drawing the armature 12 toward the end of the coil against the action of spring 14. As the pivoted armature moves toward the end of the coil the offset portion of the armature as shown in FIGURE 2 moves in a clockwise direction and strikes the contact bar 21 of the interrupter moving it away from the contact 20. This opens the interrupter circuit, de-energizing the coil 13 and causing the spring 14 to return the armature bar and through the pawl 11 to the rotate the ratchet wheel 10, shaft 2 and wiper arm 3 an amount sufficient to move the wiper from one contact to another. As soon as the armature moves away from the end of the coil the contact bar 21 is released and returns to make contact with the contact 20 and complete the interrupter circuit with the coil 13. The operation is then repeated until the wiper blade reaches the home or zero contact. The interrupter circuit is disconnected by the reset home switch 31 operated by a cam or other means not shown when the wiper blade is in the home or zero position.

Referring to FIGURE 1 in which the circuit for apparatus embodying applicant's invention is diagrammatically shown, stepping switches as described in connection with FIGURE 2 are employed and parts shown in FIGURE 1 corresponding to parts shown in FIGURE 2 will be designated by the same reference characters used in FIGURE 2.

The apparatus shown in FIGURE 1 is a form of control means for a group of electrically controlled devices or appliances which are controlled to operate either alone or in groups in a series of predetermined successive steps comprising a complete cycle of operations. The number of steps in the sequence is greater than the practicable number of successive contacts or positions on a stepping switch. A plurality of stepping switches each having a plurality of banks or contact points are employed which operate successively. While only two stepping switches each having three banks and with five contact points and a home or zero position on each bank are disclosed, a larger number of stepping switches and each with more contact points may be used. The first stepping switch is mounted on the rotatable shaft 2 having a plurality of spaced wiper blades 3, 3a and 3b which on being rotated contact the successive contact points 4, 5, 6, 7, 8, 4a, 5a, 6a, 7a, 8a, and 4b, 5b, 6b, 7b, 8b, and the homing or zero contacts 9, 9a and 9b on the three banks of contact points making up the first stepping switch. The two stepping switches as shown in the drawing are in the zero or home position. Each stepping switch is provided with a home position switch 28 and 45 respectively, each of which is spring loaded and closed only when its respective stepping switch is in the home or zero position and is open in all other positions of the stepping switch. Each stepping switch is also provided with a reset home switch 31 and 44 respectively, each of which is spring loaded and is open when its respective stepping switch is in the home or zero position and is closed in all other positions of the stepping switch.

An auxiliary circuit is provided for electrically moving the first stepping switch from the zero position to the first position comprising the magnet coil 27 directly connected to one lead of the power line A—A and connected in series with the home position switches 28 and 45 and back to the other lead of the power line A—A. A spring loaded normally open switch 26 in the line 18 from the shaft 2 to the magnet coil 13 is actuated by the magnet coil 27 and is closed when the magnet coil 27 is energized. An auxiliary circuit is also provided for moving the second stepping switch from the zero or home position to the first position as the first stepping switch is moved from the last position back to the zero or home position. The last contact of the second bank of the first stepping switch is in series with the magnet coil 41 which actuates the spring loaded normally open switch 40 which is in series with the magnet coil 42 for actuating the second stepping switch. A normally open spring loaded reset switch 23 is provided for completing the circuit from the power line to the interrupter switches 26 and 43 which when actuated return the stepping switches to the home positions.

Means are provided for returning the first stepping switch to its first position as the second stepping switch moves to its zero position comprising a magnet coil 48 connected to the last contact of the second bank of contacts 38a of the second stepping switch and to the lead 17. The magnet coil 48 when energized closes the normally open switch 49 which completes an auxiliary circuit from the shaft 2 to the lead 18 in series with the magnet coil 13 bypassing the open switch 26.

The contact points 4b, 5b, 6b, 7b and 8b of the third bank of the first stepping switch and the contact points 34b, 35b, 36b, 37b, and 38b of the third bank of the second stepping switch are connected to the various electrical appliances to be operated or to relays that operate switches controlling the appliances. The contact points may be connected to the conventional wired program board not shown which completes the circuits to the various appliances or groups of appliances.

At the start of the operation of the program control device the stepping switches are each in the home or zero position, the wiper blade 3 is on contact 9 and wiper blade 33 is on contact 39. The magnet coil 27 is energized and the switch 26 of the auxiliary circuit is closed completing the circuit from the shaft 2 to the magnet coil 13. When the impulse switch 16 is closed the circuit is completed from the power line A—A through the lead 18 to the shaft 2, through the auxiliary circuit, through the now closed switch 26, through the magnetic coil 13 and through the connection 17 back to the other lead of the power line A—A. The magnetic coil 13 on being energized draws the armature bar 12 toward the end of the coil against the action of its spring 14. When the impulse switch 16 is released it is opened thereby opening the circuit and de-energizing the magnet coil 13. The spring 14 that has been compressed and through a pawl 11 carried by the armature bar rotates the ratchet wheel 10 part of a turn and the wiper 3 moves from the zero position to the first position 4. The wiper arm 3a of the second bank moves to position 4a and the wiper arm 3b of the third bank moves to the contact 4b and thereby operates the appliance or group connected to it. As the first stepping switch moves to its first position 4 the homing switch 28 is opened by a pin or cam carried by the shaft 2 which is a conventional mechanism in the stepping switch art. The home switch 28 which is in series with the home switch 45 of the second stepping switch remains open all the time the stepping switch is not in the home position, the circuit of the magnetic coil 27 is broken and the coil is de-energized and the spring loaded switch 26 of the auxiliary circuit is open. The circuit from the power line to the magnetic coil 13 is now through the shaft 2, wiper blade 3 and the contact 4 and continues to be through the contacts 5, 6, 7 and 8 as the stepping switch is moved each time the impulse switch is closed and opened in the same manner as described above. The wiper blade is sufficiently wide that it does not leave one contact before engaging the next contact and in moving from contact 4 to contact 8 the wiper blade is always in engagement with one of the contacts so that the operation of the appliances is not interrupted.

When the wiper arm 3 is in engagement with the last contact 8 of the first stepping switch, the wiper arm 3a of the second bank is engaged with contact 8a to which the magnet coil 41 is connected in series. When the wiper arm is in position 8a the circuit is completed from the power line A—A through the lead 50, the magnet coil 41 is energized and closes the normally open spring loaded switch 40 and completes the auxiliary circuit through the elements making up the second stepping switch comprising the magnet coil 42. On closing the switch 16, the operation of the second stepping switch and its driving means comprising the magnet coil 42 and an armature bar is the same as that of the first stepping switch and its magnet coil 13. When the impulse switch is now opened both the magnet coil 13 and magnet coil 42 are de-energized. The spring load armature bars of each move each stepping switch a part of a revolution. The first stepping switch moves to the home position 9, the second stepping switch moves from its home position 39 to its first position 34. The wiper blade 3a of the second bank of the first stepping switch moves from its last position 8a to its home or zero position 9a. The circuit through magnetic coil 41 is opened, the magnet coil 41 de-energized and the spring loaded switch 40 of the auxiliary circuit is opened. The spring loaded home position switch 45 is opened and remains open until the second stepping switch returns to the home position. The circuit is now through the second stepping switch, namely, shaft 32, wiper arm 33 and contact 34, and continues in this way through contacts 35, 36, and 37 until the second stepping switch is in the contact position 38. When the second stepping switch wiper arm 33 is in contact with contact 38 and the impulse switch 16 is closed, the wiper arm 33a of the second bank of the second stepping switch engages the contact 38a completing the circuit through the magnet coil 48. The magnet coil closes the spring loaded switch 49 in the second auxiliary circuit of the first stepping switch which activates the magnet coil 13. Upon release of the impulse switch 16 the circuit is broken and magnet coil 13 de-energized, moving the wiper arm 3 to the first contact 4 without first going to the home position of the second stepping switch.

If it is desired to reset the control device to the home position for each of the stepping switches the spring loaded normally open reset switch 23 is held closed.

A circuit is completed from the power line through the interrupter switch 43 and switch 44 until the home position of the second stepping switch is reached and the reset home switch 44 is opened. At the same time the current passes through interrupter switch 26 and reset home switch 31 until the home position of the first stepping switch is reached and then the home reset switch 31 is opened.

It is seen that with this arrangement, a plurality of stepping switches are employed. The first goes from its zero position through each contact point, then it goes back to its zero position. The next stepping switch is actuated to move from its zero position to its first contact position as the first stepping switch goes to its zero position. The first stepping switch remains inactive until the last stepping switch has reached its last position or until the stepping switches are reset.

It is understood that other forms of stepping switches may be used. For example, stepping switches may be used in which the contact points are positioned on the periphery of a revolving drum and the wiper arm is stationary or the contact points may be in a straight line and the wiper arm moved in contact therewith on a slider rod.

While preferred embodiments of the invention have been shown and described, it is to be understood that changes and variations may be made therein without departing from the spirit and scope of the invention except as defined in the appended claims.

I claim:

1. A control device for controlling the operation of a plurality of electrically controlled devices in a predetermined sequence comprising a plurality of stepping switches including a first stepping switch and a last stepping switch each having a zero position and a plurality of contact positions, an auxiliary circuit for actuating the first stepping switch from its zero position to its first position comprising a normally open switch, a magnet coil for closing said normally open switch which magnet coil is only energized when the auxiliary circuit is closed and which auxiliary circuit is closed only when the first stepping switch is in its zero position, an auxiliary circuit for the last stepping switch comprising a normally open switch and a magnet coil for closing said normally open switch which auxiliary circuit is actuated when the last stepping switch is in its last contact position to actuate the first auxiliary circuit to move the first stepping switch to its first contact position as the last stepping switch moves to its zero position.

2. A control device for controlling the operation of a plurality of electrically controlled devices in a predetermined sequence comprising a plurality of stepping switches including a first stepping switch, the stepping switches being operable successively and each having a zero position and a plurality of contact positions, a circuit for actuating the first stepping switch comprising an impulse switch, a magnet coil, an armature actuated by the magnet coil for moving the first stepping switch through its contact positions after its zero position, an auxiliary circuit for moving the first stepping switch from its zero position to its first position comprising a normally open switch, a magnet coil for closing said normally open switch that is energized only when the first stepping switch is in the zero position.

3. A control device for controlling the operation of a plurality of electrically controlled devices in a predetermined sequence comprising a plurality of stepping switches including a first stepping switch, the stepping switches being operable successively and each having a zero position and a plurality of contact positions, a circuit for actuating the first stepping switch comprising a normally open impulse switch, a magnet coil, an armature actuated by the magnet coil for moving the first stepping switch through its contact positions, an auxiliary circuit for moving the first stepping switch from its zero position to its first contact position comprising a switch operated by the first stepping switch that is closed only while the first stepping switch is in its first position, a magnet coil in series with the switch and a normally open switch actuated to the closed position by the magnet coil when the stepping switch is in its zero position.

4. A control device for controlling the operation of a plurality of electrically controlled devices in a predetermined sequence comprising a plurality of stepping switches including a first stepping switch, the stepping switches being operable successively and each having a zero position and a plurality of contact positions, a circuit for actuating the first stepping switch comprising a normally open impulse switch, a magnet coil, an armature actuated by the magnet coil for moving the first stepping switch through its contact positions, an auxiliary circuit for moving the first stepping switch from its zero position to its first contact position comprising a switch operated by the first stepping switch that is closed only while the first stepping switch is in its first position, a magnet coil in series with the switch and a normally open switch actuated to the closed position by the magnet coil when the stepping switch is in its zero position, means for resetting the first stepping position from any of its contact positions to its zero position comprising a resetting circuit comprising a normally open reset switch, a switch that is open when the first stepping switch is in the zero position and an interrupter switch in series with the magnetic coil for moving the first stepping switch.

5. A control device for controlling the operation of a plurality of electrically controlled devices in a predetermined sequence comprising a plurality of stepping switches including a first stepping switch and a last stepping switch, the stepping switches being operable successively and each having a zero position and a plurality of contact positions, a circuit for actuating the first stepping switch comprising a normally open impulse switch, a magnet coil, an armature actuated by the magnet coil for moving the first stepping switch through its contact positions, an auxiliary circuit for moving the first stepping switch from its zero position to its first contact position comprising a switch operated by the first stepping switch that is closed only while the first stepping switch is in its first position, a magnet coil in series with the switch and a normally open switch actuated to the closed position by the magnet coil when the stepping switch is in its zero position and an auxiliary circuit for moving the first stepping switch to its first position when the last stepping switch moves to its last position comprising a magnetic coil, that is energized when the last stepping switch is in its last contact position, a normally open switch in series with and actuated to closed position by the last named magnetic coil and with the magnet coil for actuating the first stepping switch.

6. A control device for controlling the operation of a plurality of electrically operated devices in a predetermined sequence of operations comprising a first stepping switch and a second stepping switch each having a zero position and a plurality of contact positions, a circuit for operating each stepping switch comprising an impulse switch, a magnetic coil for actuating each stepping switch from its home position to its last contact position, means for moving the second stepping switch from its zero position to its first contact position as the first stepping switch is moved from its last contact position to its zero position comprising an auxiliary circuit including an auxiliary magnetic coil actuated when the first stepping switch is in its last contact position, a normally open switch actuated to the closed position by the auxiliary magnetic coil in series with the magnet coil of the second stepping switch to move the second stepping switch to its first contact position as the first stepping switch is moved from its last contact position to its zero position.

7. A control device for controlling the operation of a plurality of electrically operated devices in a predetermined sequence of operations comprising a first stepping switch and a second stepping switch each having a zero position and a plurality of contact positions, a circuit for operating each stepping switch comprising an impulse switch, a magnetic coil for actuating each stepping switch from its home position to its last contact position, means for moving the second stepping switch from its zero position to its first contact position as the first stepping switch is moved from its last contact position to its zero position comprising an auxiliary circuit including an auxiliary magnetic coil actuated when the first stepping switch is in its last contact position, a normally open switch actuated to the closed position by the auxiliary magnetic coil in series with the magnetic coil of the second stepping switch to move the second stepping switch to its first contact position as the first stepping switch is moved from its last contact position to its zero position and means for resetting a stepping switch from one of its contact positions to its zero position comprising an auxiliary circuit in series with the magnet coil for actuating the stepping switch, an interrupter switch in the auxiliary circuit and actuated by the armature bar and a normally closed reset switch in the auxiliary circuit that is actuated by the stepping switch to the open position when the stepping switch is in the zero position.

8. A control device for controlling the operation of a plurality of electrically operated devices in a predetermined sequence of operations comprising a first stepping switch and a second stepping switch each having a zero position and a plurality of contact positions, a circuit for operating each stepping switch comprising an impulse switch, a magnetic coil for actuating each stepping switch from its home position to its last contact position, means for moving the first stepping switch from its zero position to its first contact position comprising an auxiliary circuit having a magnet coil, a normally open switch actuated to closed position by the magnet coil, a switch for each stepping switch in series in the auxiliary circuit operated by the respective stepping switches that is closed when the respective stepping switch is in the zero position and is open when the stepping switch is in all other positions, means for moving the second stepping switch from its zero position to its first contact position as the first stepping switch is moved from its last contact position to its zero position comprising an auxiliary circuit including an auxiliary magnetic coil actuated when the first stepping switch is in its last contact position, a normally open switch actuated to the closed position by the auxiliary magnetic coil in series with the magnetic coil of the second stepping switch to move the second stepping switch to its first contact position as the first stepping switch is moved from its last contact position to its zero position and means for resetting a stepping switch from one of its contact positions to its zero position comprising an auxiliary circuit in series with the magnet coil for actuating the stepping switch, an interrupter switch in the auxiliary circuit and actuated by the armature bar and a normally closed reset switch in the auxiliary circuit that is actuated by the stepping switch to the open position when the stepping switch is in the zero position.

References Cited in the file of this patent

UNITED STATES PATENTS

| | | |
|---|---|---|
| 2,144,033 | Root | Jan. 17, 1939 |
| 2,290,732 | Blett | July 21, 1942 |
| 2,675,507 | Geiger | Apr. 3, 1954 |
| 2,885,576 | Nye et al. | May 5, 1955 |